United States Patent [19]
Busch

[11] Patent Number: 5,556,171
[45] Date of Patent: Sep. 17, 1996

[54] SEAT BELT BEZEL ASSEMBLY

[75] Inventor: Craig A. Busch, Armada, Mich.

[73] Assignee: TRW Vehicle Safety Systems Inc., Lyndhurst, Ohio

[21] Appl. No.: 392,377

[22] Filed: Feb. 21, 1995

[51] Int. Cl.$^6$ .............................. B60R 22/00; B60R 22/06
[52] U.S. Cl. ............................................ 297/483; 280/808
[58] Field of Search .................................. 297/483, 464, 297/484; 280/801.2, 808

[56] References Cited

U.S. PATENT DOCUMENTS

| | | | |
|---|---|---|---|
| 4,549,749 | 10/1985 | Thomas | 280/808 |
| 4,832,280 | 5/1989 | Haland et al. | |
| 4,902,041 | 2/1990 | Corbett et al. | 280/807 |
| 5,016,916 | 5/1991 | Yokote et al. | 297/465 |
| 5,037,135 | 8/1991 | Kotikovsky et al. | 297/483 |
| 5,088,794 | 2/1992 | Iwami et al. | 297/483 |
| 5,295,713 | 3/1994 | McCune et al. | 297/483 |

FOREIGN PATENT DOCUMENTS

3818920A1 of 0000 Germany.
9102217.7 of 0000 Germany.

Primary Examiner—Peter M. Cuomo
Assistant Examiner—Anthony D. Barfield
Attorney, Agent, or Firm—Tarolli, Sundheim, Covell, Tummino & Szabo

[57] ABSTRACT

A bezel assembly (40) for seat belt webbing (16) includes a bezel (42) and a trim plate (44) with a track (88) on which the bezel (42) is movable. The bezel (42) has a slot (62) through which the seat belt webbing (16) is movable in a lengthwise direction. The bezel (42) further has an axis (45) parallel to the lengthwise direction. The bezel (42) is supported for sliding movement along the track (88) in opposite directions perpendicular to the axis (45), and is supported for rotation about the axis (45) at any location to which the bezel (42) is slidable along the track (88).

22 Claims, 5 Drawing Sheets

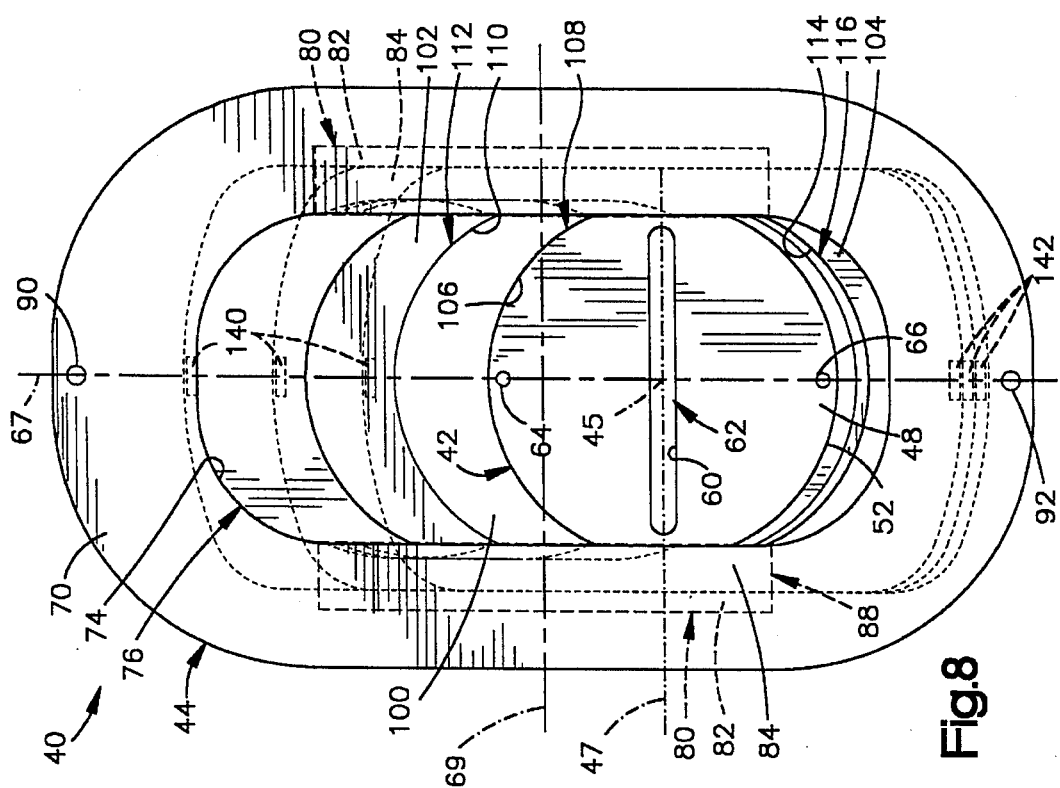
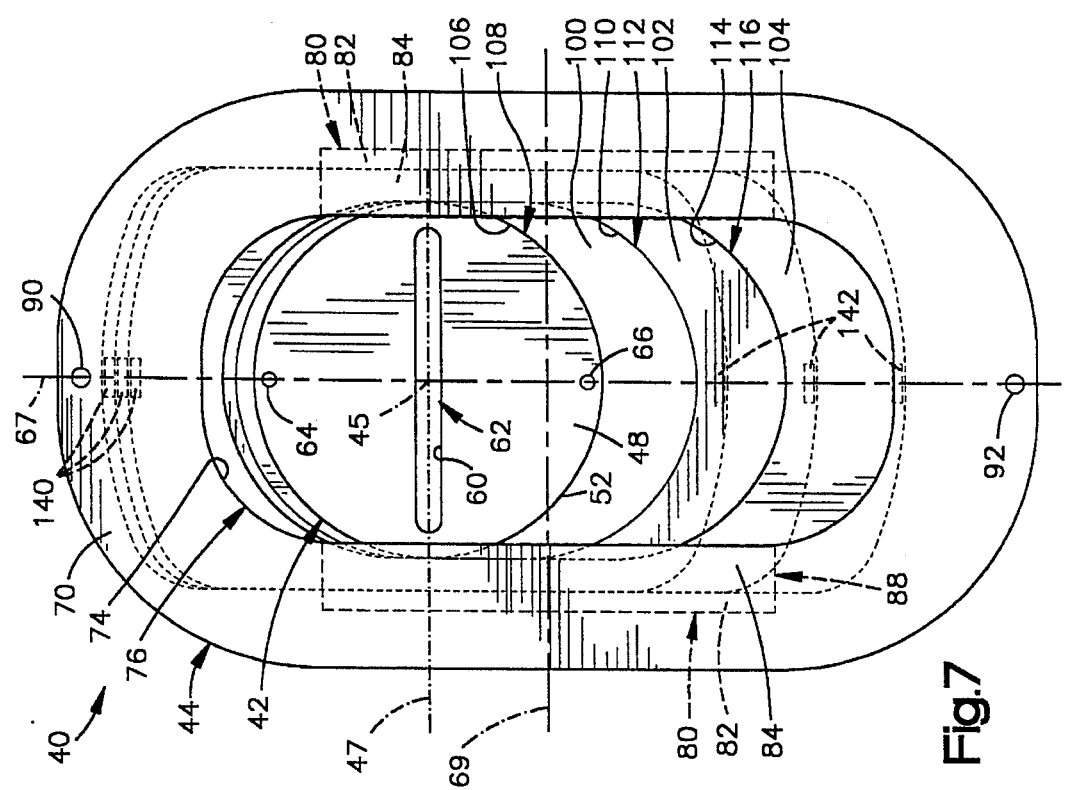

5,556,171

SEAT BELT BEZEL ASSEMBLY

FIELD OF THE INVENTION

The present invention relates to a seat belt system for restraining a vehicle occupant, and particularly relates to a seat belt system including a bezel assembly with a slot through which the seat belt webbing extends.

BACKGROUND OF THE INVENTION

A seat belt system for restraining a vehicle occupant directs the seat belt webbing to extend over the occupant. For example, in a three point seat belt system, one end of the webbing is wound on a spool in a retractor which is fixed to the vehicle. The other end of the webbing is connected to a webbing anchor which also is fixed to the vehicle. A tongue is slidable along the length of the webbing. The system further includes a buckle which is fixed to the vehicle. When the tongue on the webbing is locked in the buckle, a lap belt portion of the webbing extends across the occupant's lap, and a shoulder belt portion of the webbing extends across the occupant's torso. It is desirable for the shoulder belt portion of the webbing to lie flat against the occupant's torso.

SUMMARY OF THE INVENTION

In accordance with the present invention, a seat belt system for restraining a vehicle occupant comprises seat belt webbing, bezel means, and support means. The bezel means defines a slot through which the seat belt webbing is movable in a lengthwise direction. The bezel means further has an axis parallel to the lengthwise direction. The support means supports the bezel means for movement under the influence of the seat belt webbing in accordance with the size of a vehicle occupant wearing the seat belt webbing. The support means thus supports the bezel means for sliding movement in opposite directions perpendicular to the axis, and for rotation about the axis at any location within the range of sliding movement of the bezel means.

In a preferred embodiment of the present invention, the bezel means and the support means comprise parts of a bezel assembly which is mounted on the back portion of a vehicle seat. The bezel assembly includes spring means for biasing the bezel means to a rest position. When the bezel means is in the rest position, it directs the seat belt webbing to extend from the slot toward and against a vehicle occupant of a first predetermined size. The support means supports the bezel means for sliding movement from the rest position against the bias of the spring means in each of the opposite directions. The bezel means is thus slidable upward to a raised position for directing the seat belt webbing to extend from the slot toward and against a vehicle occupant of a second, larger predetermined size. The bezel means is also slidable downward to a lowered position for directing the seat belt webbing to extend from the slot toward and against a vehicle occupant of a third, smallest predetermined size. Additionally, the rotation of the bezel means enables the webbing to move through the slot without creasing at any of the different positions to which the bezel means is slidable. The bezel means is thus movable in accordance with the size of a vehicle occupant so as to direct the webbing to lie flat against the occupant's torso.

BRIEF DESCRIPTION OF THE DRAWINGS

Further features of the present invention will become apparent to those skilled in the art to which the present invention relates from reading the following description with reference to the accompanying drawings, in which:

FIG. 7 is a view similar to FIG. 2 showing parts in different positions; and

FIG. 8 is a view similar to FIG. 2 showing parts in other different positions.

DESCRIPTION OF A PREFERRED EMBODIMENT

Figure 1:
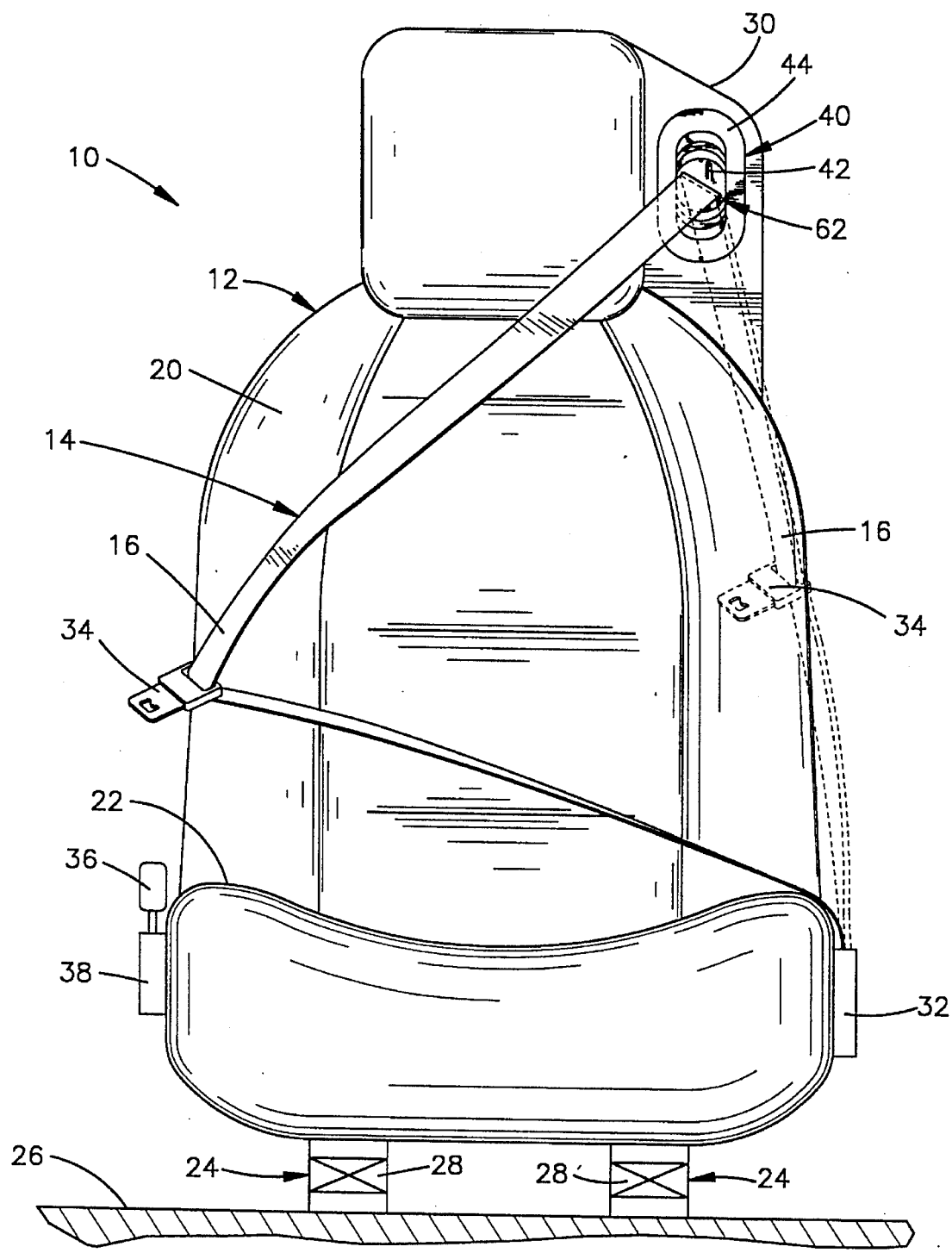
FIG. 1 is a schematic view of an apparatus comprising a preferred embodiment of the present invention.

An apparatus 10 comprising a preferred embodiment of the present invention is shown schematically in FIG. 1. The apparatus 10 includes a vehicle seat 12 and a seat belt system 14. The seat belt system 14 includes seat belt webbing 16 for restraining an occupant of the seat 12. In the preferred embodiment of the present invention, the seat belt system 14 is a seat integrated system which is supported entirely on the seat 12.

The seat 12 has a back portion 20 and a bottom portion 22. The bottom portion 22 of the seat 12 is supported directly on a pair of track assemblies 24 which are fixed to the vehicle floor 26. Each track assembly 24 includes a respective bearing assembly 28. The bearing assemblies 28 enable the seat 12 to slide along the track assemblies 24 for adjustment of the position of the seat 12. Such track assemblies and bearing assemblies are known the art.

The seat belt webbing 16 extends from a retractor housing 30 to a webbing anchor 32. The webbing anchor 32 is fixed to the bottom portion 22 of the seat 12, and thus anchors the lower end of the webbing 16 to the bottom portion 22 of the seat 12. The retractor housing 30 is mounted on the back portion 20 of the seat 12, and contains a seat belt retractor (not shown) for the webbing 16. As known in the art, the retractor includes a spool and a rewind spring. The webbing 16 is connected at its upper end to the spool, and is thus anchored to the back portion 20 of the seat 12 by the retractor and the retractor housing 30.

The seat belt system 14 further includes a tongue 34 and a seat belt buckle 36. The buckle 36 is anchored to the bottom portion 22 of the seat 12 by a buckle anchor 38. The tongue 34 is slidable along the length of the webbing 16 and is releasably lockable in the buckle 36. These parts of the seat belt system 14 also are known in the art.

The webbing 16 is movable back and forth between a fully retracted position and a fully extracted position upon winding and unwinding of the webbing 16 on the spool in the retractor housing 30. When the webbing 16 is in the fully retracted position, it is fully wound onto the spool, and a portion of the webbing 16 is located on one side of the seat 12, as shown in dashed lines in FIG. 1. When the webbing 16 is in the fully extracted position, it is fully unwound from the spool, and is extracted from the retractor housing 30 sufficiently to enable the tongue 34 to reach the buckle 36 at the other side of the seat 12. The rewind spring in the retractor is stressed as the spool rotates in an unwinding direction when a vehicle occupant extracts the webbing 16 from the retractor housing 30 and moves the tongue 34 toward the buckle 36. When the vehicle occupant releases the tongue 34 from the buckle 36, the rewind spring rotates the spool in the winding direction to retract the webbing 16 into the retractor housing 30, and thereby to move the webbing back to the fully retracted position. As known in the art, the retractor further includes a locking mechanism for blocking unwinding rotation of the spool in response to a condition indicating the occurrence of a vehicle collision.

As shown in FIG. 1, the retractor housing 30 includes a bezel assembly 40. The webbing 16 extends outward from the retractor housing 30 through the bezel assembly 40. The bezel assembly 40 covers an opening (not shown) in the retractor housing 30, and thus conceals the retractor from view.

Figure 2:
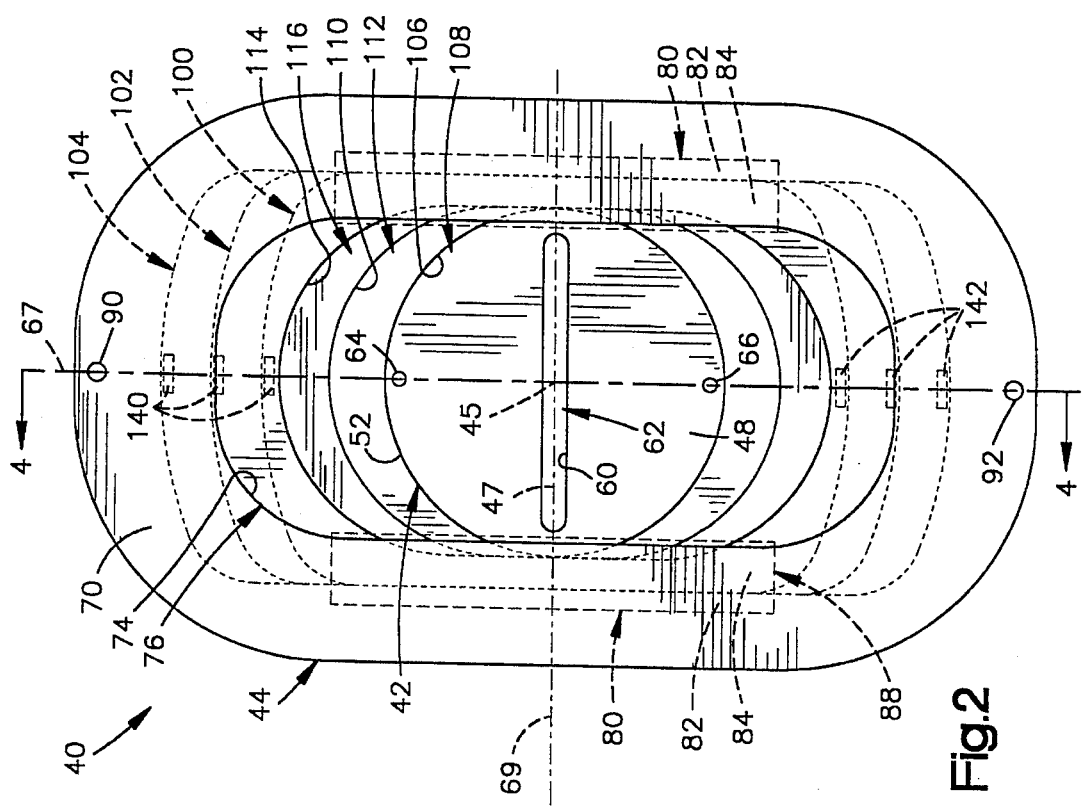
FIG. 2 is a front view of parts of the apparatus of FIG. 1.
Figure 5:
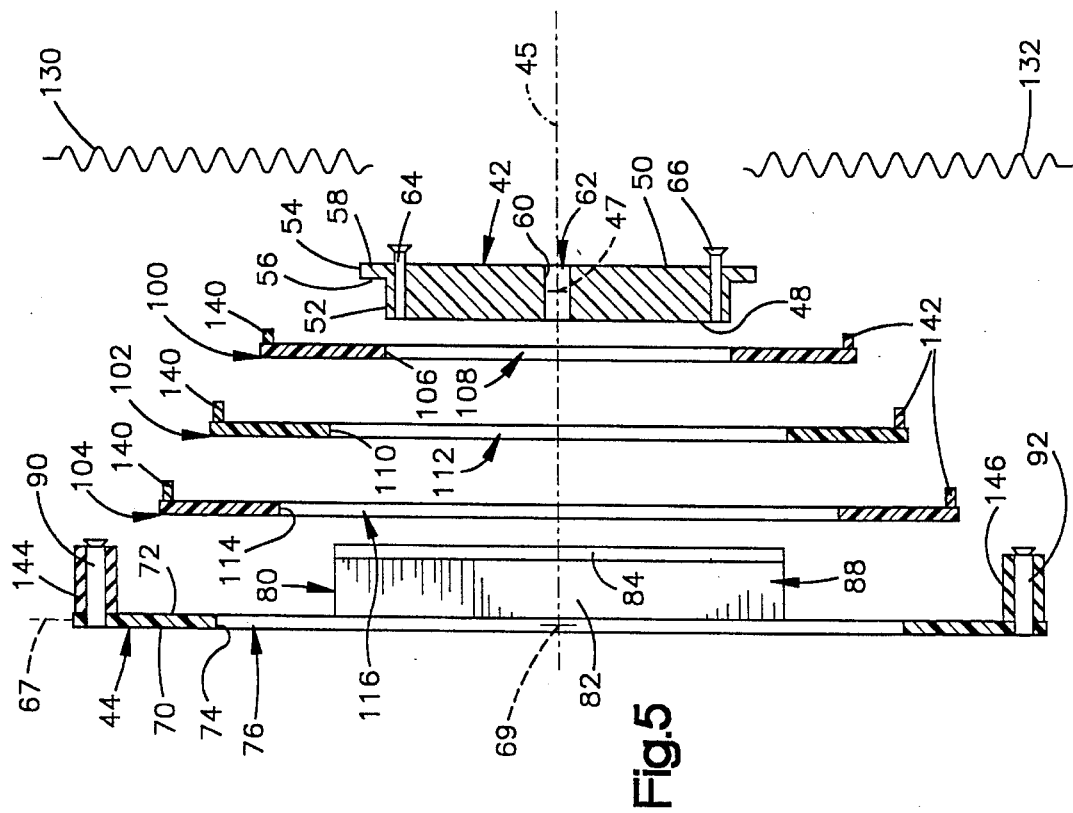
FIG. 5 is an exploded view of the parts shown in FIG. 4.

As shown in greater detail in FIG. 2, the bezel assembly 40 includes a bezel 42 and a trim plate 44. The bezel 42 is a circular part with a central axis 45 and a diametrically extending axis 47. As best shown in FIG. 5, the bezel 42 has front and rear side surfaces 48 and 50, each of which is perpendicular to the central axis 45. The bezel 42 further has first and second cylindrical outer surfaces 52 and 54, each of which extends circumferentially around the central axis 45. An annular shoulder surface 56 also is perpendicular to the central axis 45, and extends radially outward from the first cylindrical outer surface 52 to the second cylindrical outer surface 54. The shoulder surface 56 thus defines the radial width of a circular flange portion 58 of the bezel 42.

An inner edge surface 60 of the bezel 42 defines a slot 62 for the seat belt webbing 16 (FIG. 1). As shown in FIG. 5, the slot 62 extends through the center of the bezel 42 between the front and rear side surfaces 48 and 50. As shown in FIG. 2, the slot 62 is symmetrical with respect to both the central axis 45 and the diametrical axis 47. The length of the slot 62 is slightly greater than the width of the webbing 16, and the width of the slot 62 is slightly greater than the thickness of the webbing 16. The webbing 16 extends closely through the slot 62, as shown in FIG. 1, and is movable through the slot 62 in a lengthwise direction, i.e., along the central axis 45, upon extraction and retraction of the webbing 16.

An upper spring mounting pin 64 and a lower spring mounting pin 66 project from the rear side surface 50 of the bezel 42. The spring mounting pins 64 and 66 are equally spaced from the central axis 45 of the bezel in opposite directions that are perpendicular to the diametrical axis 47.

Figure 4:
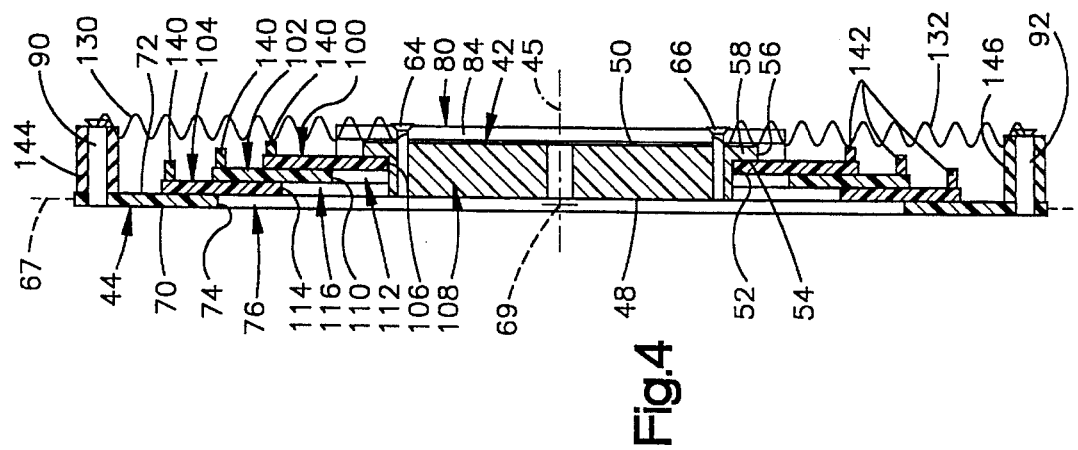
FIG. 4 is a view taken on line 4—4 of FIG. 2.

As shown in FIG. 2, the trim plate 44 is an elongated part, and is symmetrical about longitudinal and transverse centerlines 67 and 69, respectively. As best shown in FIG. 4, the trim plate 44 has a planar front side surface 70, a planar rear side surface 72, and an inner edge surface 74. The inner edge surface 74 defines an opening 76 extending through the trim plate 44 between the front and rear side surfaces 70 and 72. As shown in FIG. 2, the opening 76 also has an elongated shape which is symmetrical about the longitudinal and transverse centerlines 67 and 69.

A pair of elongated guide members 80 are located at the rear side of the trim plate 44. The guide members 80 are parallel to, and equally spaced from, the longitudinal centerline 67. Each guide member 80 is an L-shaped part with a first leg 82 projecting from the rear side surface 72 of the trim plate 44, and with a second leg 84 projecting from the first leg 82 toward the other guide member 80. The guide members 80 are thus opposed to each other across the trim plate 44 so as to define a track 88 which extends along the length of the trim plate 44.

A pair of spring mounting studs 90 and 92 also project from the rear side surface 72 of the trim plate 44. The spring mounting studs 90 and 92 are located on the longitudinal centerline 67, and are equally spaced from the transverse centerline 69.

The bezel assembly 40 further includes first, second and third slider panels 100, 102 and 104. As shown in FIG. 2, the slider panels 100, 102 and 104 are elongated in the direction of the longitudinal centerline 67 of the trim plate 44. The lengths of the slider panels 100, 102 and 104 differ from each other, but their widths are equal to each other. The widths of the slider panels 100, 102 and 104 are further equal to the transverse distance across the track 88 between the first legs 82 of the opposed guide members 80.

Figure 6C:
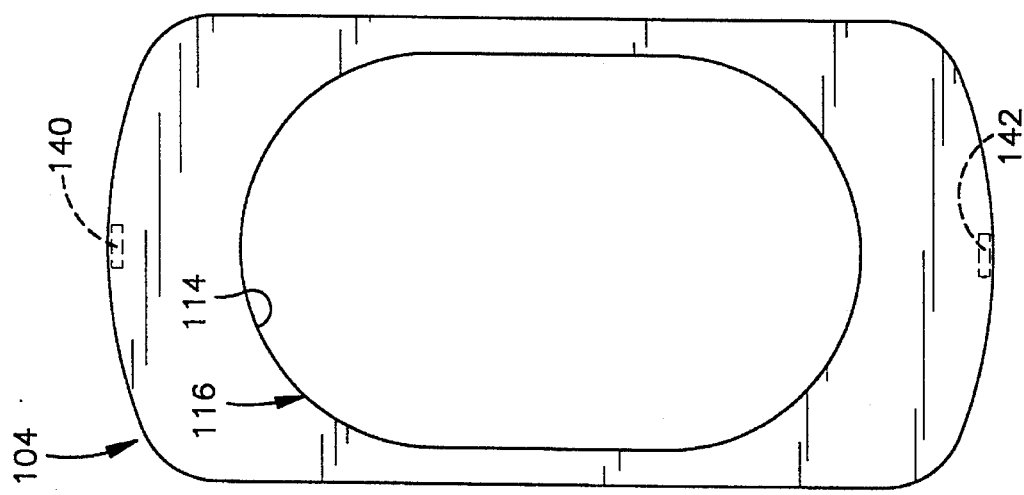
FIGS. 6A, 6B, and 6C are front views of parts shown in FIG. 4.
Figure 6B:
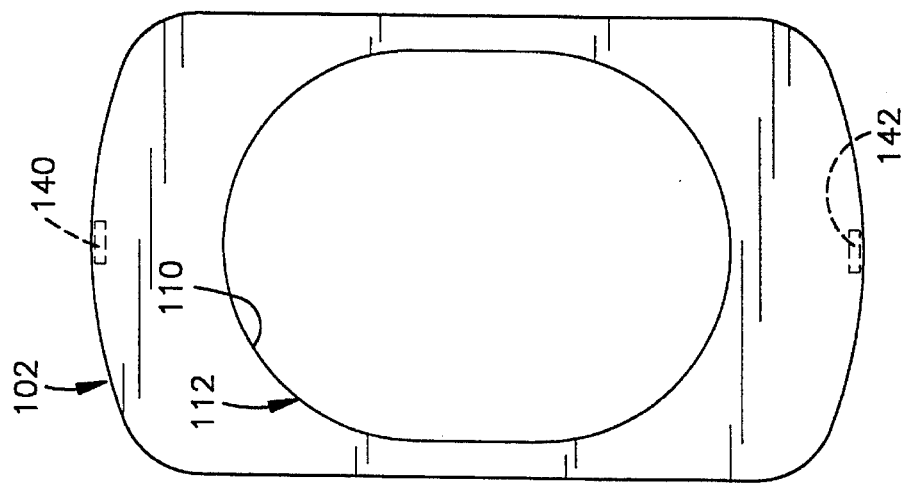
Figure 6A:
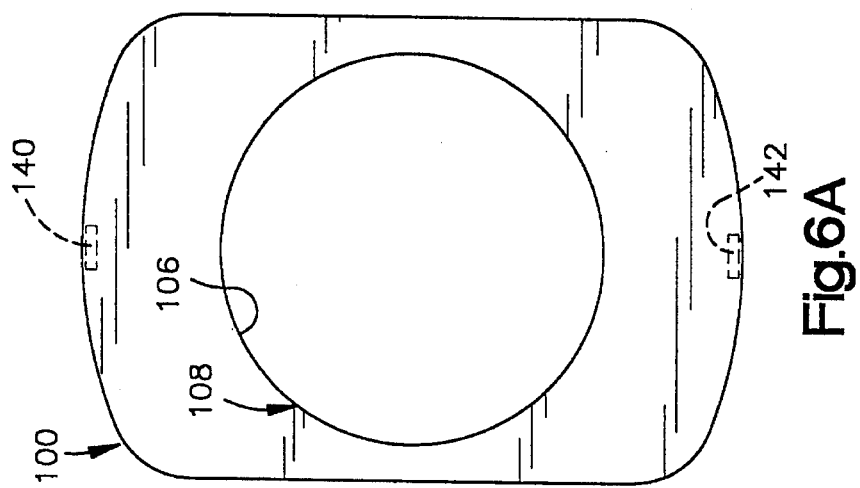

As shown in FIGS. 5 and 6A, the first slider panel 100 is the shortest of the three slider panels 100, 102 and 104, and has an inner edge surface 106 defining a circular opening 108. The diameter of the opening 108 is equal to, or just slightly greater than, the diameter of the first cylindrical outer surface 52 of the bezel 42. The second slider panel 102 has an intermediate length, and has an inner edge surface 110 defining an opening 112. The third, longest slider panel 104 similarly has an inner edge surface 114 defining an opening 116. Unlike the opening 108 in the first slider panel 100, the openings 112 and 116 in the second and third slider panels 102 and 104 are not circular. As shown in FIGS. 6B and 6C, the openings 112 and 116 in the second and third slider panels 102 and 104 have elongated shapes that are similar to the shape of the opening 76 in the trim plate 44 (FIG. 2), with the opening 116 being longer than the opening 112.

The foregoing parts of the bezel assembly 40 are assembled together as best indicated by a comparison of the exploded view of FIG. 5 with the assembled view of FIG. 4. The second slider panel 102 is sandwiched between the first and third slider panels 100 and 104. The three slider panels 100, 102 and 104 are thus stacked together in the track 88 (FIG. 5) at the rear of the trim plate 44. The bezel 42 also is received in the track 88. Specifically, the bezel 42 extends coaxially through the circular opening 108 in the first slider panel 100. The first cylindrical outer surface 52 of the bezel 42 adjoins the inner edge surface 106 of the first slider panel 100. The circular flange portion 58 of the bezel 42 abuts the first slider panel 100 around the periphery of the circular opening 108. Each of the second legs 84 on the opposed guide members 80, which are located on opposite sides of the track 88, extends a short distance transversely inward over the rear side surface 50 of the bezel 42. The bezel 42 and the three slider panels 100, 102 and 104 thus fit closely together within the track 88.

When the bezel 42 and the slider panels 100, 102 and 104 are received together in the track 88 as described above, they are movable in the track 88 relative to each other and relative to the trim plate 44. The slider panels 100, 102 and 104 are guided to slide along the track 88 longitudinally, but are constrained from moving transversely, by the opposed guide members 80 at the opposite sides of the track 88. Since the bezel 42 is received closely through the circular opening 108 in the first slider panel 100, it slides along the track 88 with the first slider panel 100, and is likewise constrained from moving transversely. However, the first cylindrical outer surface 52 and the shoulder surface 56 on the bezel 42 are movable in rotational sliding contact with the adjoining surfaces on the first slider panel 100. The bezel 42 is thus rotatable about the central axis 45 relative to the first slider panel 100.

As shown schematically in the drawings, the bezel assembly 40 further includes an upper spring 130 and a lower spring 132. The upper spring 130 extends from the upper spring mounting stud 90 on the trim plate 44 to the upper spring mounting pin 64 on the bezel 42. The lower spring 132 extends from the lower spring mounting stud 92 on the trim plate 44 to the lower spring mounting pin 66 on the bezel 42. The springs 130 and 132 bias the bezel 42 to a rest position, as shown in FIGS. 2 and 4. When the bezel 42 is in the rest position, the central axis 45 of the bezel 42 intersects the longitudinal centerline 67 of the trim plate 44. Additionally, the spring mounting pins 64 and 66 on the bezel 42 are centered on the longitudinal centerline 67 of the trim plate 44. The diametrical axis 47 of the bezel 42, and hence the slot 62, then extends transversely across the trim plate 44 on the transverse centerline 69.

Figure 3:
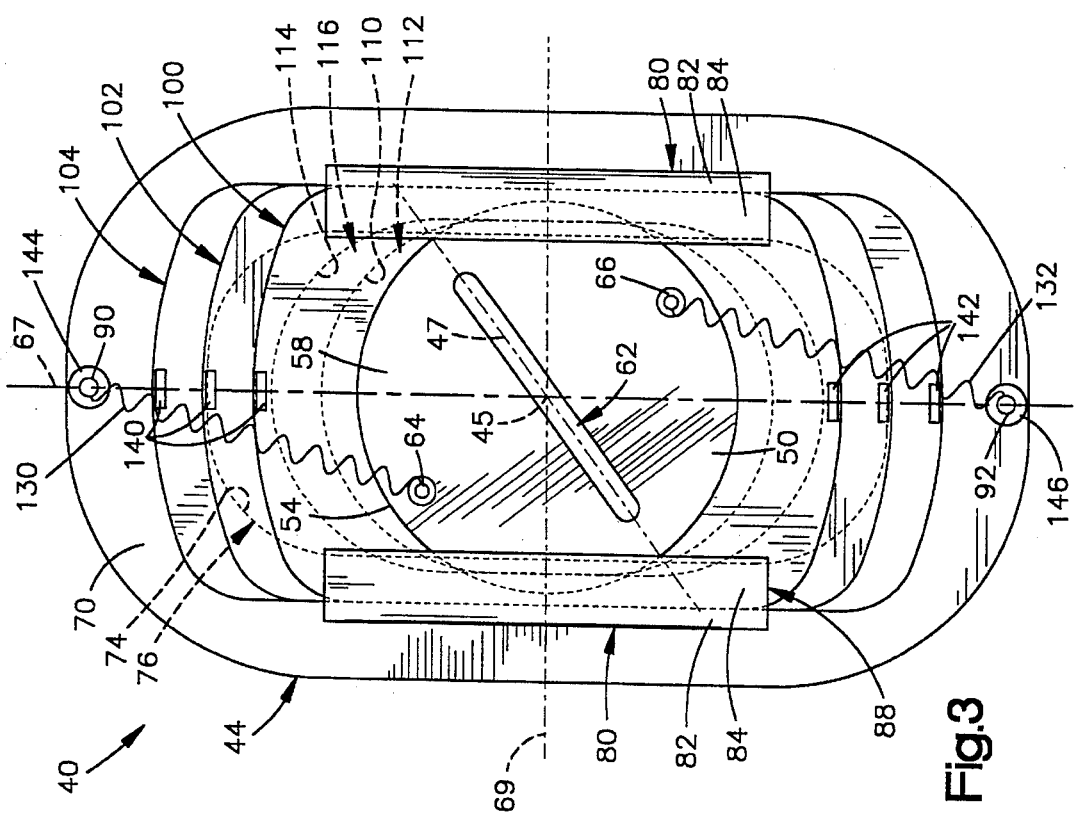
FIG. 3 is a rear view of the parts shown in FIG. 2, with certain parts shown in different positions.

The bezel 42 is slidable upward from the rest position against the bias of the lower spring 132, and is subsequently slidable back downward to the rest position under the influence of the lower spring 132. In the same manner, the bezel 42 is slidable downward from the rest position against the bias of the upper spring 130, and is subsequently slidable back upward to the rest position under the influence of the upper spring 130. As shown in FIG. 3, both springs 130 and 132 are tensioned when the spring mounting pins 64 and 66 on the bezel 42 move circumferentially away from the longitudinal centerline 67 upon rotation of the bezel 42 from the rest position. Such tensioning of the springs 130 and 132 occurs upon rotation of the bezel 42 in either a clockwise or a counterclockwise direction, as viewed in the drawings. The bezel 42 is subsequently rotatable back to the rest position under the influence of both of the springs 130 and 132. Moreover, the bezel 42 can rotate in this manner at any location to which it is slidable along the track 88.

As described above with reference to FIG. 1, the seat belt webbing 16 extends outward from the retractor housing 30 through the slot 62 in the bezel 42. When an occupant of the seat 12 has locked the tongue 34 in the buckle 36, the webbing 16 extends downward over the torso of the occupant from the bezel 42 to the tongue 34. The rewind spring in the retractor housing 30 then imparts tension to the webbing 16. Such tension draws the webbing 16 toward and against the torso of the occupant.

In accordance with the present invention, the bezel assembly 40 directs the webbing 16 to lie flat against the torso of the occupant. This is accomplished by movement of the bezel 42. Specifically, when the occupant moves the webbing 16 from the fully retracted position toward the fully extracted position, the webbing 16 acts on the bezel 42 so as to rotate the bezel 42 in the clockwise direction, as viewed in FIG. 1. The webbing 16 thus rotates the bezel 42 from the rest position of FIG. 2 to the rotated position of FIG. 3. The slot 62 in the bezel 42 is then inclined so that the webbing 16 extends outward from the slot 62 toward the tongue 34 without being creased. The webbing 16 is thus directed to lie flat against the occupant's torso across the entire width of the webbing 16.

The bezel 42 also moves in accordance with the size of the occupant. For example, if the occupant is larger (i.e., taller) than a predetermined median size, the occupant's shoulder will be high enough to hold the webbing 16 in a position from which it will act on the bezel 42 so as to slide the bezel 42 upward from the rest position to a raised position. If the occupant is smaller (i.e., shorter) than the predetermined median size, the tension in the webbing 16 will cause the webbing 16 to slide the bezel 42 downward from the rest position to a lowered position. Preferably, the range of sliding movement of the bezel 42 between its uppermost position, as shown in FIG. 7, and its lowermost position, as shown in FIG. 8, is greater than the radius of the bezel 42. The bezel 42 thus moves in accordance with the size of the occupant so as to direct the webbing 16 to lie flat against the occupant.

With further reference to FIG. 2, the slider panels 100, 102 and 104 together extend longitudinally in opposite directions from the bezel 42 to the opposite ends of the opening 76 in the trim plate 44. As best shown in FIG. 5, each of the slider panels 100, 102 and 104 has an upper tab 140 and a lower tab 142. When the bezel 42 is moved upward from the rest position of FIG. 2 to the uppermost position of FIG. 7, the upper edge of the first slider panel 100 moves upward into contact with the upper tab 140 on the second slider panel 102. The upper tab 140 on the second slider panel 102, and hence the second slider panel 102 itself, is then carried upward with the first slider panel 100. Subsequently, the first and second slider panels 100 and 102 move together against the upper tab 140 on the third slider panel 104 to carry the third slider panel 104 upward to the position of FIG. 7. An elastomeric cushion 144 on the upper spring mounting stud 90 then blocks further upward movement of the slider panels 100, 102 and 104. The lower tabs 142 and an elastomeric cushion 146 on the lower spring mounting stud 90 control downward sliding movement of the slider panels 100, 102 and 104 in the same manner.

When the slider panels 100, 102 and 104 slide upward or downward in the foregoing manner, they continue to extend fully from the bezel 42 to the opposite ends of the opening 76 throughout the entire range of sliding movement of the bezel 42. The slider panels 100, 102 and 104 thus conceal the retractor from view through the opening 76 throughout the entire range of sliding movement of the bezel 42.

From the above description of the invention, those skilled in the art will perceive improvements, changes and modifications. For example, the bezel 42 could have an alternative rest position located above or below the rest position shown by way of example in FIGS. 2 and 4. Also, a different number of slider panels could be used. Such improvements, changes and modifications within the skill of the art are intended to be covered by the appended claims.

Having described the invention, the following is claimed:

1. Apparatus comprising:

seat belt webbing;

bezel means for defining a slot through which said seat belt webbing is movable in a lengthwise direction, said bezel means having an axis parallel to said lengthwise direction; and support means for supporting said bezel means for movement under the influence of said seat belt webbing in accordance with the size of a vehicle occupant wearing said seat belt webbing, said support means thus supporting said bezel means for sliding movement in opposite directions perpendicular to said axis and for rotation about said axis at any location of said bezel means within the range of said sliding movement.

2. Apparatus as defined in claim 1 further comprising spring means for biasing said bezel means to a rest position for directing said seat belt webbing to extend from said slot toward and against a vehicle occupant of a first predetermined size, said support means supporting said bezel means for sliding movement upward from said rest position against the bias of said spring means, whereby said bezel means is slidable to a raised position for directing said seat belt webbing to extend from said slot toward and against a vehicle occupant of a second predetermined size which is larger than said first predetermined size.

3. Apparatus as defined in claim 2 wherein said support means further supports said bezel means for sliding movement downward from said rest position against the bias of said spring means, whereby said bezel means is slidable to a lowered position for directing said seat belt webbing to extend from said slot toward and against a vehicle occupant of a third predetermined size which is smaller than said first predetermined size.

4. Apparatus as defined in claim 1 further comprising spring means for biasing said bezel means to a rest position, said support means supporting said bezel means for sliding movement from said rest position against the bias of said spring means in each of said opposite directions.

5. Apparatus as defined in claim 1 further comprising spring means, said support means supporting said bezel means for rotation about said axis against the bias of said spring means in opposite directions about said axis.

6. Apparatus as defined in claim 1 wherein said bezel means has a circular shape with a radius, said range of said sliding movement being greater than said radius.

7. Apparatus as defined in claim 1 wherein said bezel means has a circular shape centered on said axis.

8. Apparatus comprising:

seat belt webbing;

bezel means for defining a slot through which said seat belt webbing is movable in a lengthwise direction, said bezel means having an axis parallel to said lengthwise direction;

support means for supporting said bezel means for movement under the influence of said seat belt webbing in accordance with the size of a vehicle occupant wearing said seat belt webbing; and spring means for biasing said bezel means to a rest position;

said support means supporting said bezel means for sliding movement from said rest position against the bias of said spring means in each of two opposite sliding directions perpendicular to said axis.

9. Apparatus as defined in claim 8 wherein said support means further supports said bezel means for rotation about said axis against the bias of said spring means in each of two opposite rotational directions about said axis.

10. Apparatus as defined in claim 9 wherein said bezel means is rotatable in each of said rotational directions throughout the entire range of said sliding movement.

11. Apparatus as defined in claim 8 wherein said spring means comprises a first spring extending from said bezel means to said support means in one of said sliding directions and a second spring extending from said bezel means to said support means in the other of said sliding directions.

12. Apparatus comprising:

seat belt webbing;

bezel means for defining a slot through which said seat belt webbing is movable in a lengthwise direction, said bezel means having an axis parallel to said lengthwise direction; and support means for supporting said bezel means for movement under the influence of said seat belt webbing in accordance with the size of a vehicle occupant wearing said seat belt webbing, said support means supporting said bezel means for sliding movement in opposite directions perpendicular to said axis;

said support means including a trim member defining an opening which is elongated in said opposite directions, said bezel means being slidable between opposite ends of said opening, said support means further including closure means for moving with said bezel means in said opposite directions and for extending from said bezel means to said opposite ends of said opening throughout the entire range of said sliding movement of said bezel means.

13. Apparatus as defined in claim 12 wherein said closure means comprises a slider panel which supports said bezel means for rotation on said slider panel.

14. Apparatus as defined in claim 13 further comprising a plurality of additional slider panels, each of said slider panels being slidable in said opposite directions relative to each other slider panel.

15. Apparatus as defined in claim 12 further comprising spring means for biasing said bezel means to a rest position for directing said seat belt webbing to extend from said slot toward and against a vehicle occupant of a first predetermined size, said support means supporting said bezel means for sliding movement upward from said rest position against the bias of said spring means, whereby said bezel means is slidable to a raised position for directing said seat belt webbing to extend from said slot toward and against a vehicle occupant of a second predetermined size which is larger than said first predetermined size.

16. Apparatus as defined in claim 15 wherein said support means further supports said bezel means for sliding movement downward from said rest position against the bias of said spring means, whereby said bezel means is slidable to a lowered position for directing said seat belt webbing to extend from said slot toward and against a vehicle occupant of a third predetermined size which is smaller than said first predetermined size.

17. Apparatus comprising:

seat belt webbing;

bezel means for defining a slot through which said seat belt webbing is movable in a lengthwise direction, said bezel means having an axis parallel to said lengthwise direction; and support means for supporting said bezel means for movement under the influence of said seat belt webbing in accordance with the size of a vehicle occupant wearing said seat belt webbing, said support means thus supporting said bezel means for sliding movement in opposite directions perpendicular to said axis and for rotation about said axis at any location of said bezel means within the range of said sliding movement;

said support means including a trim member defining an opening which is elongated in said opposite directions, said bezel means being slidable between opposite ends of said opening, said support means further including closure means for moving with said bezel means in said opposite directions and for extending from said bezel means to said opposite ends of said opening throughout said range of said sliding movement of said bezel means.

18. Apparatus as defined in claim 17 wherein said closure means comprises a slider panel which supports said bezel means for rotation on said slider panel.

19. Apparatus as defined in claim 18 wherein said closure means further comprises a plurality of additional slider panels, each of said slider panels being movable in said opposite directions relative to each other slider panel.

20. Apparatus comprising:

seat belt webbing;

bezel means for defining a slot through which said seat belt webbing is movable in a lengthwise direction, said bezel means having an axis parallel to said lengthwise direction;

support means for supporting said bezel means for movement under the influence of said seat belt webbing in accordance with the size of a vehicle occupant wearing said seat belt webbing; and spring means for biasing said bezel means to a rest position;

said support means supporting said bezel means for sliding movement from said rest position against the bias of said spring means in each of two opposite sliding directions perpendicular to said axis;

said support means including a trim member defining an opening which is elongated in said opposite sliding directions, said bezel means being slidable between opposite ends of said opening, said support means further including closure means for moving with said bezel means in said opposite sliding directions and for extending from said bezel means to said opposite ends of said opening throughout the entire range of said sliding movement of said bezel means.

21. Apparatus as defined in claim 20 wherein said closure means comprises a slider panel which supports said bezel means for rotation on said slider panel.

22. Apparatus as defined in claim 21 wherein said closure means further comprises a plurality of additional slider panels, each of said slider panels being slidable in said opposite sliding directions relative to each other slider panel.

\* \* \* \* \*